United States Patent
Uppuluri et al.

(10) Patent No.: US 8,913,005 B2
(45) Date of Patent: Dec. 16, 2014

(54) METHODS AND SYSTEMS FOR ERGONOMIC FEEDBACK USING AN IMAGE ANALYSIS MODULE

(75) Inventors: Avinash Uppuluri, Sunnyvale, CA (US); Celia Morales, Sacramento, CA (US); Hari Chakravarthula, San Jose, CA (US); Sumat Mehra, Milpitas, CA (US); Tomaso Paoletti, Burlingame, CA (US)

(73) Assignee: Fotonation Limited, Ballybrit, Galway (IE)

( * ) Notice: Subject to any disclaimer, the term of this patent is extended or adjusted under 35 U.S.C. 154(b) by 500 days.

(21) Appl. No.: 13/082,568

(22) Filed: Apr. 8, 2011

(65) Prior Publication Data

US 2012/0256820 A1   Oct. 11, 2012

(51) Int. Cl.
*G09G 5/00* (2006.01)
*G06K 9/00* (2006.01)

(52) U.S. Cl.
CPC .................................. *G06K 9/00221* (2013.01)
USPC ........................................... 345/156; 351/200

(58) Field of Classification Search
CPC ......... G06F 3/013; G06F 3/005; G06F 3/011; G06F 3/017; G06F 1/163; G06F 19/322; G06F 19/3406; G06F 19/3418; G06F 19/3456; G06F 19/3487; G06F 3/0236; G06F 3/0362; G06F 3/0482; G06F 3/0489
USPC ......... 345/156; 348/333.01–333.04; 382/190, 382/206
See application file for complete search history.

(56) References Cited

U.S. PATENT DOCUMENTS

| | | | |
|---|---|---|---|
| 4,051,458 A * | 9/1977 | Morton | 382/274 |
| 4,887,892 A * | 12/1989 | Bacus | 382/133 |
| 5,661,539 A * | 8/1997 | Sheedy | 351/239 |
| 6,076,928 A * | 6/2000 | Fateh et al. | 351/203 |
| 6,275,614 B1 | 8/2001 | Krishnamurthy et al. | |
| 6,937,745 B2 | 8/2005 | Toyama | |
| 7,165,715 B2 * | 1/2007 | Elgie et al. | 235/375 |
| 7,188,772 B2 * | 3/2007 | Elgie et al. | 235/472.01 |

(Continued)

FOREIGN PATENT DOCUMENTS

| | | |
|---|---|---|
| EP | 2515526 A2 | 10/2012 |
| WO | WO 2008/107002 A1 | 9/2008 |
| WO | WO 2010/060211 A1 | 6/2010 |

OTHER PUBLICATIONS

U.S. Appl. No. 12/825,280.

(Continued)

*Primary Examiner* — Alexander Eisen
*Assistant Examiner* — Sanjiv D Patel
(74) *Attorney, Agent, or Firm* — Hickman Palermo Truong Becker Bingham Wong LLP

(57) ABSTRACT

A display device can be used with an ergonomic sensor comprising an imaging device interfaced to processing hardware to obtain and analyze image data depicting a user of the display device. The ergonomic sensor can be preconfigured with data indicating ergonomic uses of the display device so that the image of the user can be analyzed with minimal or no user calibration or setup. Instead, the ergonomic sensor can analyze the image data to provide real-time feedback, such as warnings or suggestions when the user's behavior falls outside an ergonomic use range for the display device. In some implementations, the ergonomic sensor is integrated with the display device, though in other implementations a separate element or preexisting imaging device can be used.

36 Claims, 4 Drawing Sheets

(56) References Cited

U.S. PATENT DOCUMENTS

| | | | |
|---|---|---|---|
| 7,565,030 | B2 | 7/2009 | Steinberg et al. |
| 7,583,253 | B2 | 9/2009 | Jeng et al. |
| 7,626,569 | B2 | 12/2009 | Lanier |
| 2002/0102024 | A1 | 8/2002 | Jones et al. |
| 2002/0105482 | A1* | 8/2002 | Lemelson et al. ............. 345/7 |
| 2003/0122810 | A1* | 7/2003 | Tsirkel et al. ............. 345/207 |
| 2003/0219704 | A1* | 11/2003 | Bleckley et al. ............. 434/257 |
| 2004/0219964 | A1* | 11/2004 | Bleckley et al. ............. 463/13 |
| 2006/0071135 | A1 | 4/2006 | Trovato |
| 2006/0227249 | A1 | 10/2006 | Chen et al. |
| 2007/0066916 | A1* | 3/2007 | Lemos ............. 600/558 |
| 2007/0110305 | A1 | 5/2007 | Corcoran et al. |
| 2007/0216709 | A1* | 9/2007 | Kojima et al. ............. 345/619 |
| 2007/0296556 | A1* | 12/2007 | Wang et al. ............. 340/309.16 |
| 2008/0013798 | A1 | 1/2008 | Ionita et al. |
| 2008/0175481 | A1 | 7/2008 | Petrescu et al. |
| 2008/0219517 | A1 | 9/2008 | Blonk et al. |
| 2008/0259325 | A1* | 10/2008 | Engelbart et al. ............. 356/237.3 |
| 2009/0003661 | A1 | 1/2009 | Ionita et al. |
| 2009/0133051 | A1* | 5/2009 | Hildreth ............. 725/28 |
| 2009/0138805 | A1* | 5/2009 | Hildreth ............. 715/745 |
| 2009/0179998 | A1 | 7/2009 | Steinberg et al. |
| 2009/0185753 | A1 | 7/2009 | Albu et al. |
| 2009/0190803 | A1 | 7/2009 | Neghina et al. |
| 2009/0232357 | A1* | 9/2009 | Angell et al. ............. 382/103 |
| 2009/0324024 | A1 | 12/2009 | Worthington |
| 2010/0164731 | A1* | 7/2010 | Xie ............. 340/573.1 |
| 2011/0050938 | A1 | 3/2011 | Capata |
| 2012/0075483 | A1* | 3/2012 | Paoletti ............. 348/207.1 |
| 2013/0050395 | A1 | 2/2013 | Paoletti et al. |
| 2013/0057553 | A1 | 3/2013 | Chakravarthula et al. |
| 2013/0057573 | A1 | 3/2013 | Chakravarthula et al. |
| 2013/0141623 | A1* | 6/2013 | Akita et al. ............. 348/333.01 |

OTHER PUBLICATIONS

U.S. Appl. No. 12/893,674.

Yang, M. et al., "Detecting Faces in Images: A Survey," 2002, IEEE Transactions on Pattern Analysis and Machine Intelligence, vol. 24, 21 pages.

Moshe Ben Ezra et ai, Motion Deblurring Using Hybrid Imaging, IEEE 2003.

Mejdi Trimeche, Multichannel image deblurring of raw color components, SPIE 2005.

John Russ, The Image Processing Handbook ch 3, CRC Press 2002.

Xinqiao Liu, Photocurrent Estimation from Multiple Non-destructive Samples in a CMOS Image Sensor, SPIE 2001.

Peter Jansson, Deconvolution of Images and Spectra, Second Edition, Academic Press, 1997.

\* cited by examiner

METHODS AND SYSTEMS FOR ERGONOMIC FEEDBACK USING AN IMAGE ANALYSIS MODULE

BACKGROUND

A computer user often spends a majority of his or her day interacting with the computer. For example, an office worker may spend hours in front of a display driven by a desktop or other computer. The user's health may be adversely affected if he or she uses the computer in an ergonomically-improper manner, such as viewing the display from a non-optimal location and/or under other unfavorable conditions that can be corrected through user behavior. Various techniques for ensuring ergonomically-proper computer use have been proposed, but there remains room for improvement.

SUMMARY

A display device can be used with an ergonomic sensor comprising an imaging device interfaced to processing hardware to obtain and analyze image data depicting a user of the display device. The ergonomic sensor can be preconfigured with data indicating ergonomic uses of the display device so that the image of the user can be analyzed with minimal or no user calibration or setup. Instead, the ergonomic sensor can provide image data to be analyzed for use in providing real-time feedback, such as warnings or suggestions when the user's behavior falls outside an ergonomic use range for the display device. In some implementations, the ergonomic sensor is integrated with the display device, though in other implementations a separate element or preexisting imaging device can be used.

This example is discussed not to limit the present subject matter but to provide a brief introduction. Additional examples are described below in the Detailed Description. Objects and advantages of the present subject matter can be determined upon review of the specification and/or practice of an implementation according to one or more teachings herein.

BRIEF DESCRIPTION OF THE DRAWINGS

A full and enabling disclosure is set forth more particularly in the remainder of the specification, which makes reference to the following figures.

DETAILED DESCRIPTION

Example implementations will now be described more fully hereinafter with reference to the accompanying drawings; however, they may be embodied in different forms and the present subject matter should not be construed as limited to the examples set forth herein. Rather, these examples are provided so that this disclosure will be thorough and complete, and will fully convey the present subject matter to those skilled in the art.

Figure 1:
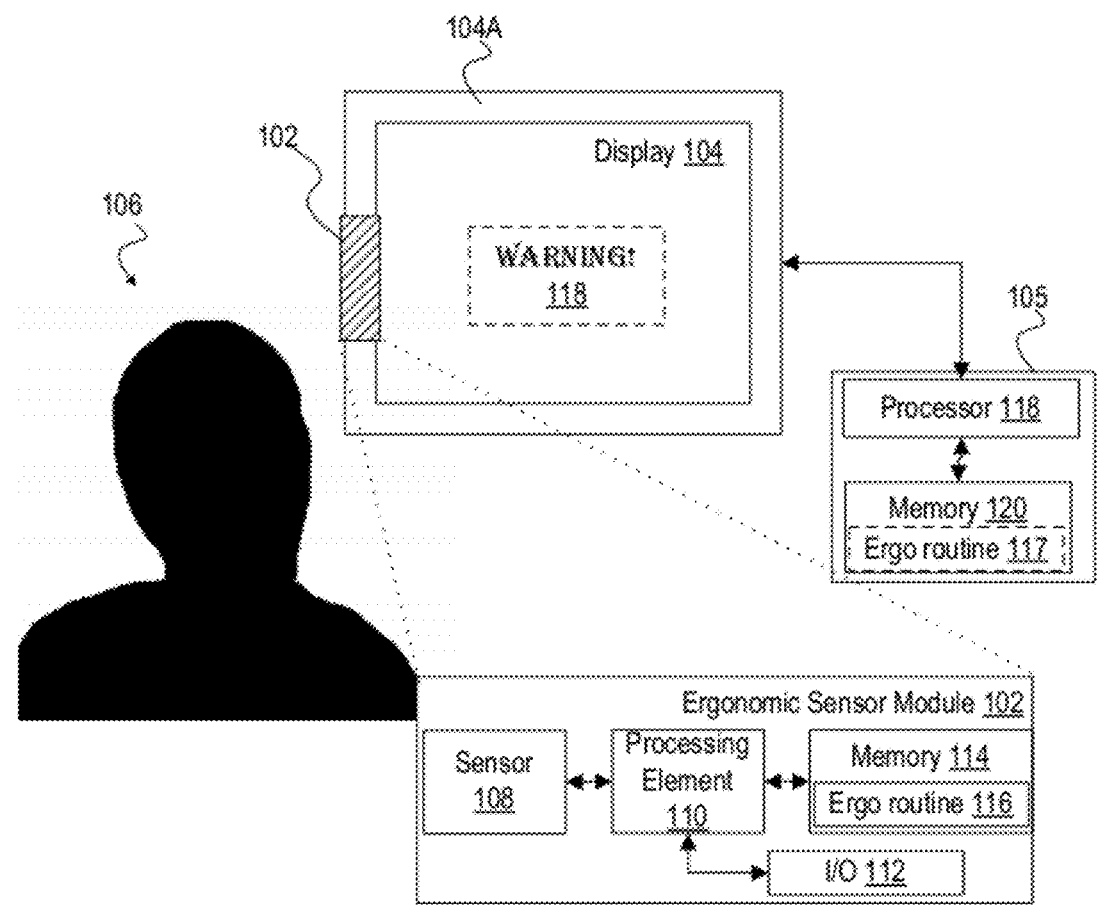
FIG. 1 is a block diagram showing an illustrative ergonomic sensor module.

FIG. 1 is a block diagram showing an illustrative ergonomic sensor module 102 in use with a display 104 used with a computer system 105. The computer system may comprise a desktop, laptop, server, game system, mobile device, or other computing device driving display 104. Display 104 can, of course, comprise any suitable display type including, but not limited to, an LCD, plasma, CRT, or other display or even a television. Sensor module 102 is positioned so it can produce image data of a user 106 of display device 104. In this example, sensor module 102 is positioned on or in a structural element 104A of display 104, such as the display bezel or housing. Sensor module 102 can be positioned at any suitable location relative to display 104 and could even be positioned separate from the display. User 106 may be sitting, standing, or otherwise in proximity to display 104.

As shown in the inset, sensor module 102 includes one or more image sensing devices (sensor 108), a processing element 110, and an input/output interface 112. For example, sensor 108 may comprise a CMOS or other image sensing technology usable to provide still and/or video image data. Processing element 110 can comprise a microprocessor, digital signal processor (DSP), application-specific integrated circuit (ASIC), or other hardware logic configurable to sample data from sensor 108 and provide output via I/O interface 112.

Processing element 110 is configured to obtain image data from the image sensing device and, in this example, analyze the image data to determine, based on accessing predefined data defining an ergonomic use range of the display device, whether the image data indicates that a user of the display is using the display within the ergonomic use range. In this example, processing element 110 is further interfaced to memory 114, which represents any suitable non-transitory computer-readable medium and includes program code of an ergonomic analysis routine 116 that configures processing element 110 to obtain and analyze the data. For instance, memory 114 may comprise RAM, ROM, cache, or other memory or a storage device (e.g., magnetic disk, optical disk, flash memory, etc.). However, as noted above, implementations can use a hardware-based approach (e.g., an ASIC, programmable logic array, or other hardware logic that causes processing element 110 to perform the analysis and generate output).

In some implementations, I/O interface 112 is connected to the display device 104 and processing element 110 is further configured to output a feedback message 118 using the display device in response to determining that the image data indicates that a user of the display is not using the display within the ergonomic use range. For example, ergonomic analysis routine 116 can direct processing element 110 to use I/O interface to display warning message 118 without intervention or processing by computer 105.

Computer 105 comprises processor 118, memory 120, and other conventional computer components (e.g., busses, network interface, display interface, storage media, etc.). In some implementations, ergonomic analysis routine 117 is carried out by computer 105 in addition to or instead of ergonomic analysis routine 116. For example, an ergonomic sensor module comprising sensor 108, processing element 110, and I/O interface 112 may simply provide the image data to ergonomic analysis routine 117. In some implementations, a webcam or other imaging device serves as ergonomic sensor module 102.

Figure 2:
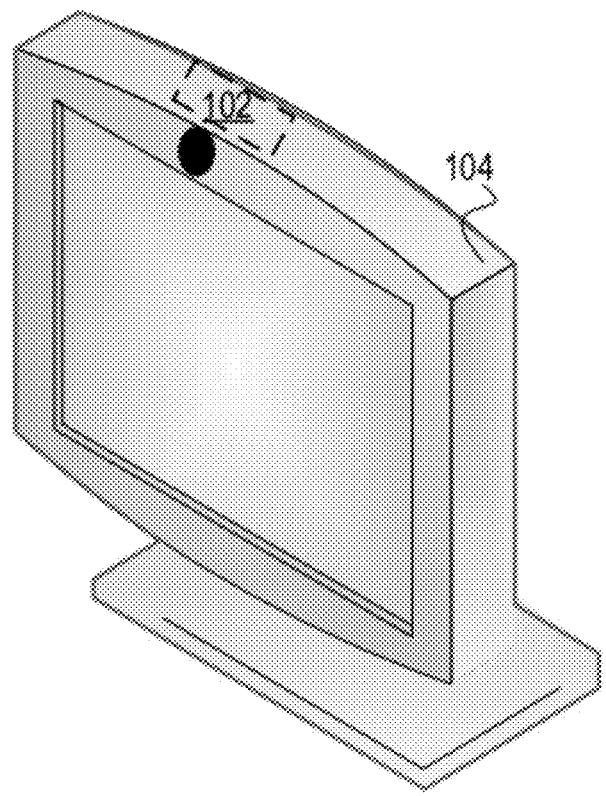
FIG. 2 is a diagram showing an example of an ergonomic sensor module integrated into a display.

FIG. 2 is a diagram showing an example of an ergonomic sensor module 102 integrated into a structural element of a display. In this example, the components of sensor module 102 are housed within a bezel of display 104 with an aperture on the front face of the display to image a user. For example, ergonomic sensor module 102 may be configured as a built-in webcam that provides image data to ergonomic analysis routine 117 hosted at computer 105 (not shown) interfaced to display 104. However, sensor module 102 may include sufficient processing capability to host ergonomic analysis routine 116 and provide output directly using display 104. Although module 102 is integrated into the display bezel, a module 102 could be integrated into other structural elements (e.g., the display base, in the screen itself, etc.).

Figure 3:
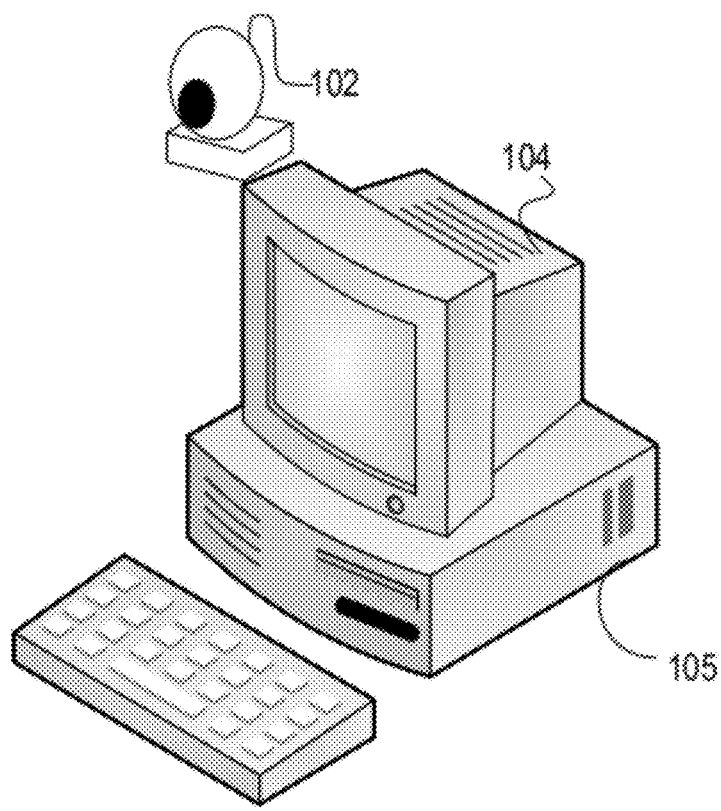
FIG. 3 is a diagram showing an example of an ergonomic sensor module used externally to a display.

FIG. 3 is a diagram showing an example of an ergonomic sensor module 102 used externally to a display 104 interfaced to a computer 105. In this example, ergonomic sensor module 102 comprises a webcam. For instance, the webcam can provide image data over a USB or other interface for use by a processor of computer 105 to analyze and determine appropriate feedback. The webcam can be attached to or positioned on display device 104, such as on top of the display device, on a front face of the display device, etc. Of course, the web cam could be positioned beside the display device or elsewhere as well. Computer 105 can be provided with software or firmware (embodied in a nontransitory computer readable medium) so that computer 105 carries out some or all of the ergonomic analysis based on image data from the webcam.

The webcam and integrated form factors and positions shown above are for purposes of example only. The imaging device can be positioned at any suitable point to provide an image of the user of display 104. In some implementations, the imaging device is positioned to capture light representing an image of the user as seen from display 104 (e.g., using a sensor or optics that capture light heading toward a front face of the display).

Figure 4:
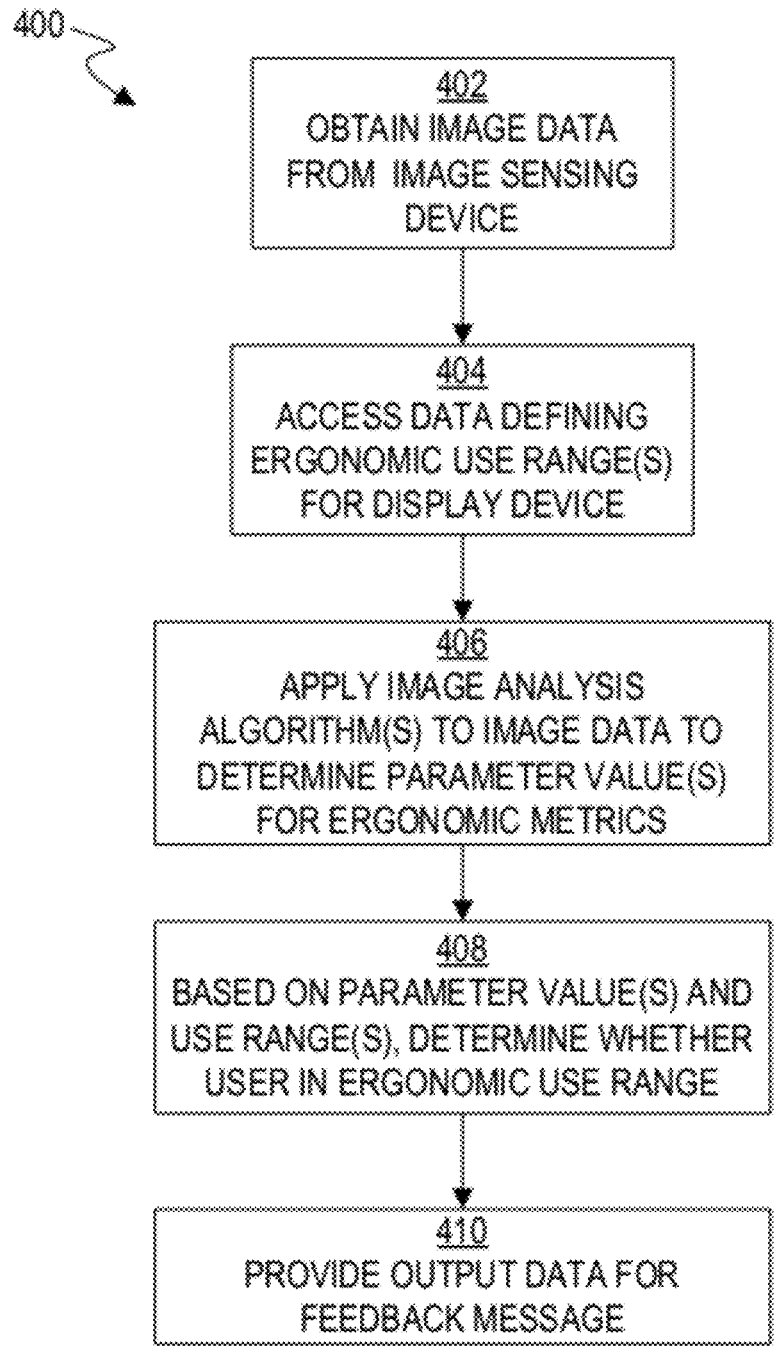
FIG. 4 is a flowchart showing steps in an illustrative processing method carried out when using an ergonomic sensor module.

FIG. 4 is a flowchart showing steps of an illustrative method 400 carried out when using an ergonomic sensor module. For example, method 400 may be carried out by ergonomic analysis routine 116 implemented by module 102 and/or may be carried out by ergonomic analysis routine 117 implemented by computer 105 based on image data. The sensor module may carry out method 400 in the course of executing software or firmware. However, method 400 may be carried out in hardware-based implementations as well, such as by hardware logic such as an application-specific integrated circuit (ASIC), programmable logic array (PLA), arrangement of logic gates, or other hardware that can obtain input values (e.g., pixel values) and process the input values to determine an output (e.g., whether the pixel values indicate an ergonomic use). In practice, method 400 or another image analysis method can be carried out on a periodic or continuous basis to provide real-time feedback to one or more users.

Block 402 represents obtaining image data from the image sensing device (e.g., the image sensor(s)). For example, this block can comprise accessing image data from the image sensing device, and determining that the image data depicts a user of a display device. If the user is not present, the remainder of the routine need not be carried out. Presence of the user can be determined by analyzing the field of view, such as using motion detection algorithm, comparison of a background image to the image data, face detection, or in some other way. In some implementations, multiple users can be recognized, for example by using face detection.

Generally speaking, blocks 404-408 represent analyzing the image data to determine, based on predefined data defining an ergonomic use range of the display device, whether the image data indicates that the user of the display is using the display within the ergonomic use range. If multiple users are recognized, the routine may determine whether each user is making ergonomic use of the display. In some embodiments, however, analyzing the image includes selecting one of the users (e.g., the primary user) to determine if that user is making ergonomic use. For example, a user can be selected by determining the largest face size seen by the imaging system at a given instant Block 404 represents accessing data defining one or more ergonomic use ranges for the display device. The ergonomic use range(s) can be defined as ranges of various parameters of ergonomic metrics, the ergonomic metrics used to characterize the pose of the user and the ambient use conditions. At block 406, one or more image analysis algorithms are applied to the image data to determine parameter values for corresponding ergonomic metrics, and at block 408 the parameter values are compared to the ergonomic use ranges to determine whether the user is in an ergonomic use range for one or more of the ergonomic metrics.

In some implementations, the data is analyzed to determine a parameter value for one or more of the following ergonomic metrics, with the parameter value compared to the ergonomic use range listed below. However, these metrics and ranges are provided for purposes of example only. Embodiments can use additional ergonomic metrics and/or ergonomic use ranges to suit particular needs.

| Ergonomic Metric | Ergonomic Use Range |
| --- | --- |
| Distance from monitor (ISO 9241-5) | Ergonomic use is distance of 45 cm to 75 cm |
| Viewing angle for line of sight and angle of view (ISO 9241-5) | Ergonomic use is a viewing angle not greater than 40 degrees |
| Time user has been staring at the monitor | Ergonomic use is staring for less than 10 s |
| Glare conditions from or toward monitor (ISO 8995-1) | Ergonomic use is no glare behind or near the user or on the screen |
| Ambient light conditions (8995-1, OSHO 1926.56(a) | Ergonomic use is between 100 and 900 lux |
| Face roll angle relative to display | Ergonomic use is within +/−30 degrees |
| Face yaw angle relative to display | Ergonomic use is within +/−15 degrees |
| Face pitch angle relative to display | Ergonomic use is within +/−20 degrees |
| Time proximate to display without break | Ergonomic use is any time interval less than the threshold period of time for taking a break |

The image data can be analyzed in any suitable way to yield parameter values for the ergonomic metrics. For example, in some implementations the analysis includes using a face recognition algorithm to determine where the user's face lies in the image. Use of facial recognition algorithms can allow the sensor module to analyze the use of the display independently of a shape of the user's face (e.g., without regard to whether the user's face is elliptical, square, or some other shape) The algorithm looks for skin tones and detection of face features such as eye, lips/mouth positions to determine the presence of a person and hence is independent of the actual shape of the face itself. Based on the location of the user's face, the facial portion of the image can be subjected to additional analysis algorithms to determine parameter values for various ergonomic metrics.

Additionally, by using image analysis, the question of ergonomic use can be resolved independently of precaptured posture data for the user or requiring the user to match some predefined posture or position. Instead, the image data itself is used to determine whether features of the user detectable in the image and/or ambient conditions detectable in the image are consistent (or inconsistent) with ergonomic use, without the need for complex modeling of the user. The algorithm uses a measure of inter-pupillary distance (distance between the centers of both eyes) to detect the distance of a face from the display and uses the same metric to determine if the face has a yaw/tilt/roll angles.

For example, distance from the monitor can be determined by identifying a feature (e.g., the user's eyes) in the image. Based on data indicating the sensor module's position, the distance and angle of the user can be estimated using parallax or triangulation from the user's eyes or even from the user's entire face.

In one implementation, a feature recognition algorithm locates a user's eyes based on analyzing the image to identify shadows below the user's eyes. In particular, the pixel intensity values for the image can be evaluated to identify darker regions that may correspond to shadows; if the darker regions are similarly-shaped and an acceptable distance apart, then the feature recognition algorithm may conclude that the user's eyes are above the shadows.

Image analysis that recognizes a user's eyes can be used to determine whether the user has stared for too long without blinking. For instance, a blink recognition algorithm may analyze a series of images to determine how long the user's eyes have remained open (i.e., present in the series of images). If the user's eyes have not blinked after a threshold period of time has elapsed, a warning or other feedback can be provided.

In some implementations, the user's eyes, face, and/or other distinguishing feature(s) can be used to determine whether the same user has remained proximate (e.g., in front of) the display without a break. For example, a threshold period of time may be defined for ergonomic use of the display. By analyzing the length of time the user is continuously present, the sensor module can determine if the user has exceeded the threshold and should take a break. The algorithm can also look for a minimum break duration to ensure that the user stays away from the display for a minimum period of time In some implementations, the image data is analyzed to determine information about the spatial position of the user's face relative to the display (e.g., relative to a plane of the display). For example, one or more of the user's face roll angle, yaw angle, or pitch angle relative to the display to determine if the user's face is within an ergonomic use range based on the determined angle or angles. The roll, pitch, and yaw angles may be defined as indicating angles of rotation of the plane of the user's face relative to the plane of the display.

Figure 5:
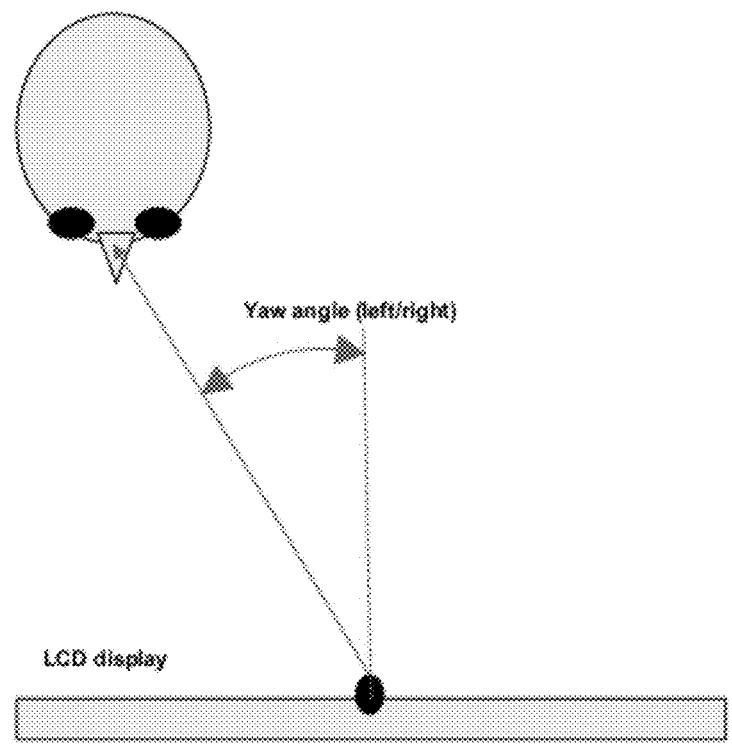
FIG. 5 is a diagram showing an example of a user's yaw angle relative to a display.

FIG. 5 illustrates the user's yaw angle relative to the display. The yaw angle measures how far to the right or the left the user is offset from a point on the display. As shown in FIG. 5 the yaw angle is the angle between a line extending from the user to a point on the display and a perpendicular line extending from the point on the display when viewed from the top or bottom of the display. For example, the line between the user and the display may include a point on the user that approximates a point between the user's eyes the mid point of the display.

Figure 6:
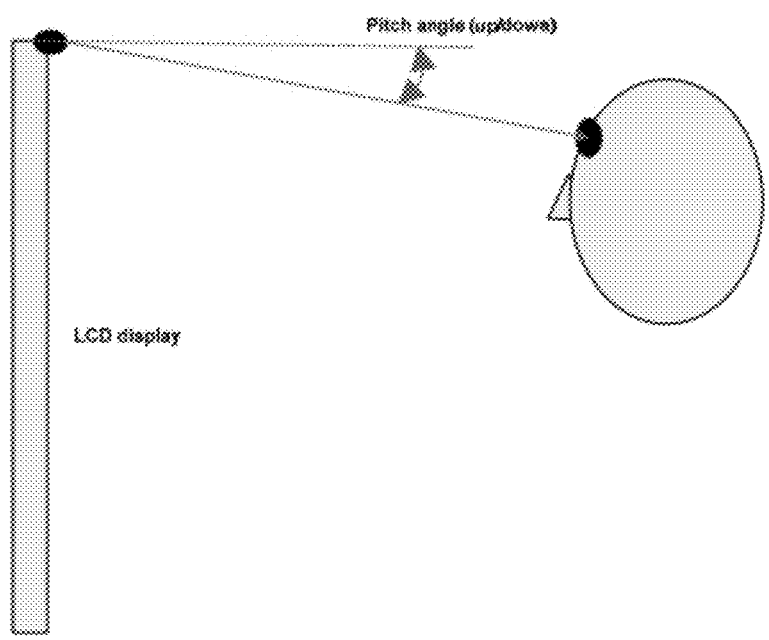
FIG. 6 is a diagram showing an example of a user's pitch angle relative to a display.

FIG. 6 illustrates the user's pitch angle relative to the display. The pitch angle measures how far above or below the user is offset from a point on the display. As shown in FIG. 6 the pitch angle is the angle between a line extending from the user to a point on the display and a perpendicular line extending from the point on the display when viewed from the side of the display. For example, the line between the user and the display may include a point on the user that approximates a point near the user's eye and a point at the top of the display.

Glare and ambient light can be recognized using an algorithm that searches the image for patterns of intensity that correspond to glare and/or ambient light that is too bright or too dim. For example, the average intensity of the image can be found and scaled to determine a parameter value for ambient light conditions. Glare from the monitor can be identified by searching for areas of the image where intensity spikes—for example, areas of the user's face such as the user's cheeks/forehead can be analyzed to determine if the user's face is reflecting a large amount of light. By analyzing intensity values across the entire image an ongoing basis, a processing element that carries out the ergonomic analysis routine can determine ergonomic use independently of changes in ambient lighting conditions. The measured intensity across the image is thresholded to determine low light conditions. The algorithm picks the area of the image proximate to the user's face and above to remove effects of the user's dark clothing lowering the average intensity value Glare toward the monitor can be identified by analyzing the image for high backlighting—assuming the image sensor is facing the user, if the user is backlit (i.e., the facial area has lower pixel intensities than areas surrounding the user's face), glare toward the monitor may be present. The intensity difference can be used to determine a parameter value to compare to the ergonomic use range for glare.

As noted above, at block 408 the ergonomic analysis routine determines whether the user is in one or more ergonomic use ranges, such as by comparing the parameter values calculated from the image to the accessed data defining use ranges, the ergonomic analysis routine can determine whether a user is within, outside, or near a limit for ergonomic use of the display.

The ergonomic analysis routine operates with displays that have multiple orientations. For example, some displays allow a user to rotate a display by approximately 90 degrees so that in one orientation the display is wider than it is tall, commonly referred to as landscape orientation, and in a second orientation the display is taller than it is wide, commonly referred to as portrait orientation. The ergonomic analysis routine determines the orientation of the display and if necessary, makes adjustments based on the orientation. In one implementation, the ergonomic analysis routine monitors a control signal and determines the orientation of the display from the state or level of the control signal.

Block 410 represents providing output data for a feedback message. The format, content, and triggering criteria for a feedback message can vary, and in some implementations the message is provided in real-time with the image analysis. As one example, a feedback message can be provided if the analysis shows that the user is outside an ergonomic use range, with the message indicating which metric (e.g., distance, angle, lack of blinking, ambient light, etc.) or metrics have been "violated." This can allow the user to take corrective action.

Feedback can also be provided to indicate when a user is near an edge of the ergonomic use range. For instance, if the user is nearly too close or far from the display (e.g., 3-4 cm from the limit), a warning may be provided to allow for corrective action. Still further, feedback can also be provided when the user is inside an ergonomic use range, for example to reinforce good use.

The format of the feedback message can vary as noted above. In one implementation, a visual message is provided by sending data to display 104. For instance, a popup window or overlay can be generated with text or graphics. Other examples include sound or other feedback.

The data for the feedback message can be provided by sensor module 102 itself or by computer 105, depending upon the particular implementation. For example, in one implementation module 102 is integrated into the display and can provide the message directly to the display while partially or completely obscuring other data provided by computer 105 (e.g., the message can be provided in an overlay rendered on top of displayed data (if any) from computer 105). However, in some implementations, ergonomic analysis routine 116 executed by module 102 provides data indicating an output message to generate and computer 105 utilizes a counterpart ergonomic analysis routine 117 hosted by computer 105 to render a window or otherwise provide the message. Still further, module 102 may simply provide image data, with the image data analyzed by an analysis routine 117 hosted by computer 105, which also renders the window or otherwise provides the message.

Several examples of using an ergonomic sensor module 102 above utilize one sensor. It will be understood that multiple sensors can be used within one module 102, and that multiple modules 102 could be used, either for a single display or for multiple displays concurrently.

Any suitable non-transitory computer-readable medium or media may be used to implement or practice the presently-disclosed subject matter, including, but not limited to, diskettes, drives, magnetic-based storage media, optical storage media (e.g., CD-ROMS, DVD-ROMS, and variants thereof), flash, RAM, ROM, register storage, cache memory, and other memory devices. For example, implementations include (but are not limited to) non-transitory computer-readable media embodying instructions that cause a processor to carry out methods as set forth herein (including, but not limited to, instructions for carrying out methods and variants thereof as discussed with FIG. 4), methods as claimed below, and/or operations carried out during the operation of implementations including (but not limited to) the examples discussed with FIGS. 1-3.

The present subject matter can be implemented by any computing device that carries out a series of operations based on commands. Such hardware circuitry or elements include general-purpose and special-purpose processors that access instructions stored in a computer-readable medium that cause the processor to carry out operations as discussed herein as well as hardware logic (e.g., field-programmable gate arrays (FPGAs), programmable logic arrays (PLAs), application-specific integrated circuits (ASICs)) configured to carry out operations as discussed herein.

As used herein, the term "and/or" includes any and all combinations of one or more of the associated listed items. Further, although terms such as "first," "second," "third," etc., may be used herein to describe various elements, components, regions, layers and/or sections, these elements, components, regions, layers and/or sections should not be limited by these terms. These terms are only used to distinguish one element, component, region, layer and/or section from another. Thus, a first element, component, region, layer and/or section could be termed a second element, component, region, layer and/or section without departing from the present teachings.

Spatially relative terms, such as "beneath," "below," "lower," "above," "upper," etc., may be used herein for ease of description to describe the relationship of one element or feature to another element(s) or feature(s), as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

As used herein, the singular forms "a," "an" and "the" are intended to include the plural forms as well, unless the context clearly indicates otherwise. It will be further understood that the terms "comprises," "comprising," "includes," and "including" specify the presence of stated features, integers, steps, operations, elements, components, etc., but do not preclude the presence or addition thereto of one or more other features, integers, steps, operations, elements, components, groups, etc.

Example implementations of the present invention have been disclosed herein and, although specific terms are employed, they are used and are to be interpreted in a generic and descriptive sense only and not for purpose of limitation. While some examples of the present invention have been described relative to a hardware implementation, the processing of present invention may be implemented using software, e.g., by an article of manufacture having a machine-accessible medium including data that, when accessed by a machine, cause the machine to access sensor pixels and otherwise undistorted the data. Accordingly, it will be understood by those of ordinary skill in the art that various changes in form and details may be made without departing from the spirit and scope of the present invention.

What is claimed:

1. An ergonomic sensor module configured for use with a display device, the sensor module comprising:
    an image sensing device;
    a processing element; and
    an input/output interface,
    wherein the processing element is configured to obtain image data from the image sensing device and analyze the image data to determine, based on predefined data defining an ergonomic use range of the display device, whether the image data indicates that a user of the display device is using the display device within the ergonomic use range, and
    wherein analyzing the image data to determine whether the image data indicates that the user of the display device is using the display device within the ergonomic use range comprises:
        determining a first image portion from the image data based at least on identifying an area proximate to a face of the user, the first image portion comprising at least the area proximate to the face of the user;
        analyzing the first image portion to measure intensity values across the first image portion; and
        determining whether a lighting condition is outside the ergonomic use range by comparing a function of the intensity values of the first image portion, but not of a second image portion, with the ergonomic use range.

2. The sensor module of claim 1, wherein the input/output interface is connected to the display device and the processing element is further configured to output a feedback message using the display device in response to determining that the image data indicates that the user of the display device is not using the display device within the ergonomic use range.

3. The sensor module of claim 1, integrated into a structural element of the display device.

4. The sensor module of claim 1, configured as a separate element attached to the display device.

5. The sensor module of claim 1, interfaced to a processing device that is also interfaced to the display device.

6. The sensor module of claim 1, wherein the processing element is configured to analyze the image data to determine whether the image data indicates that the user of the display device is using the display device within the ergonomic use range independently of a change in ambient lighting conditions.

7. The sensor module of claim 1, wherein analyzing the image data to determine whether the image data indicates that the user of the display device is using the display device within the ergonomic use range comprises:
analyzing the image data to determine at least one of a distance or viewing angle of the user relative to the display device and determining whether the distance or viewing angle is outside the ergonomic use range.

8. An ergonomic sensor module configured for use with a display device, the sensor module comprising:
an image sensing device;
a processing element; and
an input/output interface,
wherein the processing element is configured to obtain image data from the image sensing device and analyze the image data to determine, based on predefined data defining an ergonomic use range of the display device, whether the image data indicates that a user of the display device is using the display device within the ergonomic use range, wherein analyzing the image data to determine whether the image data indicates that the user of the display device is using the display device within the ergonomic use range comprises:
analyzing the image data to determine whether the user has stared without blinking beyond a threshold period of time defined in the ergonomic use range.

9. The sensor module of claim 1, wherein analyzing the image data to determine whether the image data indicates that the user of the display device is using the display device within the ergonomic use range comprises:
analyzing the image data to determine at least one of a roll angle of the face of the user, a yaw angle of the face of the user, or a pitch angle of the face of the user, respectively relative to the display device to determine if the face is within an ergonomic use range based on the determined angle or angles.

10. The sensor module of claim 1, wherein analyzing the image data to determine whether the image data indicates that the user of the display device is using the display device within the ergonomic use range comprises:
analyzing the image data to identify multiple users in view and select a particular user from the multiple users, the image data of the particular user analyzed to determine if the particular user is using the display device within the ergonomic use range.

11. The sensor module of claim 1, wherein analyzing the image data to determine whether the image data indicates that the user of the display device is using the display device within the ergonomic use range comprises:
analyzing the image data to determine whether the user has been proximate the display device beyond a threshold length of time without a break.

12. The sensor module of claim 1, wherein the processing element comprises hardware logic interfaced to the sensor, the hardware logic configured to analyze the image data to determine whether the image data indicates that the user is using the display device within the ergonomic use range.

13. The sensor module of claim 1, wherein the processing element is configured to analyze the image data to determine whether the image data indicates that the user of the display device is using the display device within the ergonomic use range independently of a shape of the face of the user.

14. An ergonomic sensor module configured for use with a display device, the sensor module comprising:
an image sensing device;
a processing element; and
an input/output interface,
wherein the processing element is configured to obtain image data from the image sensing device and analyze the image data to determine, based on predefined data defining an ergonomic use range of the display device, whether the image data indicates that a user of the display device is using the display device within the ergonomic use range, and
wherein the processing element is configured to analyze the image data to determine whether the image data indicates that the user of the display device is using the display device within the ergonomic use range, wherein analyzing the image data to determine whether the image data indicates that the user of the display device is using the display device within the ergonomic use range comprises determining whether a glare condition, outside of the ergonomic use range, exists.

15. The sensor module of claim 1, wherein the processing element is configured to analyze the image data to determine whether the image data indicates that the user of the display device is using the display device within the ergonomic use range independently of precaptured posture data for the user.

16. The sensor module of claim 1, wherein the processing element is configured to determine an orientation of the display device.

17. A computerized method, comprising:
accessing image data from an image sensing device, the image data depicting the user of a display device;
analyzing the image data to determine, based on predefined data defining an ergonomic use range of the display device, whether the image data indicates that the user of the display device is using the display device within the ergonomic use range, and
wherein analyzing the image data to determine whether the image data indicates that the user of the display device is using the display device within the ergonomic use range comprises:
determining a first image portion from the image data based at least on identifying an area proximate to a face of the user, the first image portion comprising at least the area proximate to the face of the user;
analyzing the first image portion to measure intensity values across the first image portion; and
determining whether a lighting condition is outside the ergonomic use range by comparing a function of the intensity values of the first image portion, but not of a second image portion, with the ergonomic use range.

18. The computerized method of claim 17, further comprising:
providing output data representing a feedback message to be displayed in real-time using the display device in response to analyzing.

19. The computerized method of claim 18, wherein the feedback message indicates that the user of the display device is not using the display device within the ergonomic use range.

20. The computerized method of claim 17, further comprising:
determining an orientation of the display device.

21. A non-transitory computer-readable medium, storing one or more instructions which, when executed by one or more processors, cause performance of a method comprising:
accessing image data from an image sensing device, the image data depicting a user of a display device; and
analyzing the image data to determine, based on predefined data defining an ergonomic use range of the display device, whether the image data indicates that the user of the display device is using the display device within the ergonomic use range, and
wherein analyzing the image data to determine whether the image data indicates that the user of the display device is using the display device within the ergonomic use range comprises:
determining a first image portion from the image data based at least on identifying an area proximate to a face of the user, the first image portion comprising at least the area proximate to the face of the user;
analyzing the first image portion to measure intensity values across the first image portion; and
determining whether a lighting condition is outside the ergonomic use range by comparing a function of the intensity values of the first image portion, but not of a second image portion, with the ergonomic use range.

22. The non-transitory computer-readable medium of claim 21, further comprising instructions which when executed cause:
code for providing output data representing a feedback message to be displayed in real-time using the display device in response to analyzing.

23. The non-transitory computer-readable medium of claim 22, wherein the feedback message indicates that the user of the display device is not using the display device within the ergonomic use range.

24. A non-transitory computer-readable medium, storing one or more instructions which, when executed by one or more processors, cause performance of a method comprising:
accessing image data from an image sensing device, the image data depicting a user of a display device; and
analyzing the image data to determine, based on predefined data defining an ergonomic use range of the display device, whether the image data indicates that the user of the display device is using the display device within the ergonomic use range, and
wherein analyzing the image data to determine whether the image data indicates that the user of the display device is using the display device within the ergonomic use range comprises:
analyzing the image data to determine whether the user has stared without blinking beyond a threshold period of time defined in the ergonomic use range.

25. A non-transitory computer-readable medium, storing one or more sequences of instructions which, when executed by one or more processors, cause performance of a method comprising:
accessing image data from an image sensing device, the image data depicting a user of a display device;
analyzing the image data to determine, based on predefined data defining an ergonomic use range of the display device, whether the image data indicates that the user of the display is using the display within the ergonomic use range, wherein analyzing the image data to determine whether the image data indicates that the user of the display device is using the display device within the ergonomic use range comprises determining whether a glare condition, outside of the ergonomic use range, exists.

26. A computerized method, comprising:
accessing image data from an image sensing device, the image data depicting a user of a display device;
analyzing the image data to determine, based on predefined data defining an ergonomic use range of the display device, whether the image data indicates that the user of the display device is using the display device within the ergonomic use range, and
wherein analyzing the image data to determine whether the image data indicates that the user of the display device is using the display device within the ergonomic use range comprises:
analyzing the image data to determine whether the user has stared without blinking beyond a threshold period of time defined in the ergonomic use range.

27. A computerized method, comprising:
accessing image data from an image sensing device, the image data depicting a user of a display device;
analyzing the image data to determine, based on predefined data defining an ergonomic use range of the display device, whether the image data indicates that the user of the display is using the display within the ergonomic use range, wherein analyzing the image data to determine whether the image data indicates that the user of the display device is using the display device within the ergonomic use range comprises determining whether a glare condition, outside of the ergonomic use range, exists.

28. The sensor module of claim 1, wherein the ergonomic use range for the lighting condition is from 100 to 900 lux units of luminous emittance.

29. The computerized method of claim 17, wherein the ergonomic use range for the lighting condition is from 100 to 900 lux units of luminous emittance.

30. The non-transitory computer-readable medium of claim 21, wherein the ergonomic use range for the lighting condition is from 100 to 900 lux units of luminous emittance.

31. The sensor module of claim 8, wherein the input/output interface is connected to the display device and the processing element is further configured to output a feedback message using the display device in response to determining that the image data indicates that the user has stared without blinking beyond the threshold period of time defined in the ergonomic use range.

32. The non-transitory computer-readable medium of claim 24, further comprising instructions which when executed cause:
code for providing output a feedback message using the display device in response to determining that the image data indicates that the user has stared without blinking beyond the threshold period of time defined in the ergonomic use range.

33. The computerized method of claim 26, further comprising:

providing output a feedback message using the display device in response to determining that the image data indicates that the user has stared without blinking beyond the threshold period of time defined in the ergonomic use range.

34. The sensor module of claim 1, wherein determining the first image portion from the image data comprises:
  analyzing the image data to measure intensity values across the image data; and
  identifying the first image portion as an area where the intensity values of the first image portion are higher than the intensity values of the second image portion.

35. The computerized method of claim 17, wherein determining the first image portion from the image data comprises:
  analyzing the image data to measure intensity values across the image data; and
  identifying the first image portion as an area where the intensity values of the first image portion are higher than the intensity values of the second image portion.

36. The non-transitory computer-readable medium of claim 21, wherein determining the first image portion from the image data comprises:
  analyzing the image data to measure intensity values across the image data; and
  identifying the first image portion as an area where the intensity values of the first image portion are higher than the intensity values of the second image portion.

* * * * *